United States Patent [19]
Ishizuka et al.

[11] Patent Number: 5,661,588
[45] Date of Patent: Aug. 26, 1997

[54] ROTARY POLYGON MIRROR TYPE LIGHT DEFLECTING SYSTEM

[75] Inventors: Yutaka Ishizuka; Koichi Katakura, both of Nagano, Japan

[73] Assignee: Kabushiki Kaisha Sankyo Seiki Seisakusho, Nagano, Japan

[21] Appl. No.: 523,055

[22] Filed: Sep. 1, 1995

[30] Foreign Application Priority Data

Sep. 2, 1994 [JP] Japan ................................ 6-208991

[51] Int. Cl.⁶ .......................................... G02B 26/08
[52] U.S. Cl. ...................... 359/216; 359/200; 310/90
[58] Field of Search .............................. 359/198–200, 359/216–219, 855, 871, 872; 310/90, 156; 384/490

[56] References Cited

U.S. PATENT DOCUMENTS

| | | | |
|---|---|---|---|
| 4,836,631 | 6/1989 | Shimazu et al. | 359/217 |
| 4,934,836 | 6/1990 | Tanaka et al. | 384/100 |
| 5,357,272 | 10/1994 | Watanabe et al. | 359/198 |

FOREIGN PATENT DOCUMENTS

| | | | |
|---|---|---|---|
| 58-108513 | 6/1983 | Japan | 359/200 |
| 3-177809 | 8/1991 | Japan | 359/200 |
| 5-181082 | 7/1993 | Japan | 359/198 |
| 6-067111 | 3/1994 | Japan | 359/200 |

*Primary Examiner*—James Phan
*Attorney, Agent, or Firm*—Sughrue, Mion, Zinn, Macpeak & Seas

[57] ABSTRACT

A rotary polygon mirror type light deflecting system including a mirror, a hub, and a fixed shaft made of materials whose coefficients of linear expansion are equal to one another. A fixed shaft is erected integrally with a frame. Inner races of ball bearings are secured to the fixed shaft. A stator has a coil wound around a stator core formed contiguously with the frame. A drive magnet annularly surrounding the outer circumferential surface of the stator core and a yoke are fixed to a polygon mirror with a clamper and screws through a hub. The drive magnet, the yoke, and the hub are secured to the fixed shaft and made rotatable by the outer races of the ball bearings secured to the fixed shaft.

4 Claims, 2 Drawing Sheets

ROTARY POLYGON MIRROR TYPE LIGHT DEFLECTING SYSTEM

FIELD OF THE INVENTION

The present invention relates to a polygon mirror driving apparatus that constitutes a rotary polygon mirror type light deflecting system. More specifically, the invention is directed to a polygon mirror driving apparatus having a constitution that permits stable and smooth rotation.

BACKGROUND OF THE INVENTION

A polygon mirror is likely to have a shortcoming that a laser beam is not injected into or reflected at a correct position on a mirror surface thereof if stable and smooth rotation thereof is disturbed by a change in the operating temperature. Thus, several attempts have heretofore been made to implement stable and smooth rotation.

For example, a polygon mirror driving apparatus disclosed in Japanese Patent Publication No. Hei. 3-71690 shown in FIG. 3 is characterized as having such a constitution that the outer races of ball bearings 22a, 22b are fixed with the central portions of an upper case 20 and a bracket 21 and a shaft 23 is secured to the inner races of the ball bearings 22a, 22b, so that a polygon mirror 24 rotates together with a hub 25 fixed to the shaft 23.

In this constitution, the shaft 23 is comparatively thin in diameter and long, so that the shaft 23 is generally made of carbon steel or stainless steel with high hardness. On the other hand, since the upper case 20, the bracket 21 and a lower case 26 are complicatedly shaped, they are generally formed by die-casting an aluminum alloy, a zinc alloy, or the like that is highly fusible. Let us compare the coefficient of linear expansion of carbon steel or stainless steel having high hardness with that of aluminum or zinc that is highly fusible. The coefficient of linear expansion of carbon steel is $10.7 \times 10^{-6} /°$ C., that of stainless steel is $14.7 \times 10^{-6} /°$ C., whereas that of aluminum is $23.1 \times 10^{-6} /°$ C., and that of zinc is $30.2 \times 10^{-6} /°$ C. This data attests to the fact that there is a large difference in coefficient of linear expansion between the two material groups.

If there is such a large difference between the coefficient of linear expansion of a material of which the shaft 23 is made and those of materials of which the respective casings 20, 21, 26 are made, the casing formed by the upper case 20, the bracket 21, and the lower case 26 is displaced with respect to the shaft 23 in the axial and radial directions when the temperatures of the respective members change due to change in the operating temperature of the apparatus or due to a prolonged driving of the apparatus. As a result, the preload applied to the ball bearings 22a, 22b fluctuates, which in turn changes the rotating torque within the ball bearings. Such change in the rotational torque induces irregular rotation of a motor. The irregular rotation causes jitters which does not allow a laser beam to be injected into or reflected at a correct position on a mirror surface, adversely affecting image quality.

Further, if, in the conventional structure, the coefficient of linear expansion of the hub 25 carrying the polygon mirror 24 greatly differs from that of the shaft 23, clearance and strain tend to be produced at the interface between both members. Therefore, a material of which the hub 25 is made must have the same coefficient of linear expansion as that of the shaft 23. In addition, the shaft 23 that is thin in diameter and long as shown in FIG. 2 must have an appropriate hardness. Therefore, carbon steel or stainless steel is selected.

However, the polygon mirror is generally made of an aluminum alloy. If the shaft 23 and the hub 25 are made of carbon steel, stainless steel, or the like, strain is produced between the polygon mirror 24 made of aluminum and the hub 25, which also impairs image quality.

SUMMARY OF THE INVENTION

The object of the invention is, therefore, to provide an apparatus capable of producing high-quality image by preventing strain and stress from being produced between the shaft and the hub due to temperature change, eliminating fluctuations in the pre-load applied to the ball bearings, and preventing strain and stress from being produced between the hub and the polygon mirror while making the polygon mirror, the hub, and the shaft of materials whose coefficients of linear expansion are equal to one another so that impairment of image quality can be checked.

A rotary polygon mirror type light deflecting system according to the present invention has the following components and constitution. Ball bearings are fixed with a shaft and a hub is rotatably supported by the ball bearings. Also, a drive magnet is attached to the hub so as to rotate integrally with the hub and a stator core is arranged so as to confront the drive magnet. Further, a frame holds the stator core and a polygon mirror is mounted on the hub so as to rotate integrally with the hub. In the aforementioned structure, the shaft, the hub, and the polygon mirror are made of materials whose linear expansion coefficients are equal to one another.

DETAILED DESCRIPTION OF THE PREFERRED EMBODIMENTS

1st Embodiment

Figure 1:
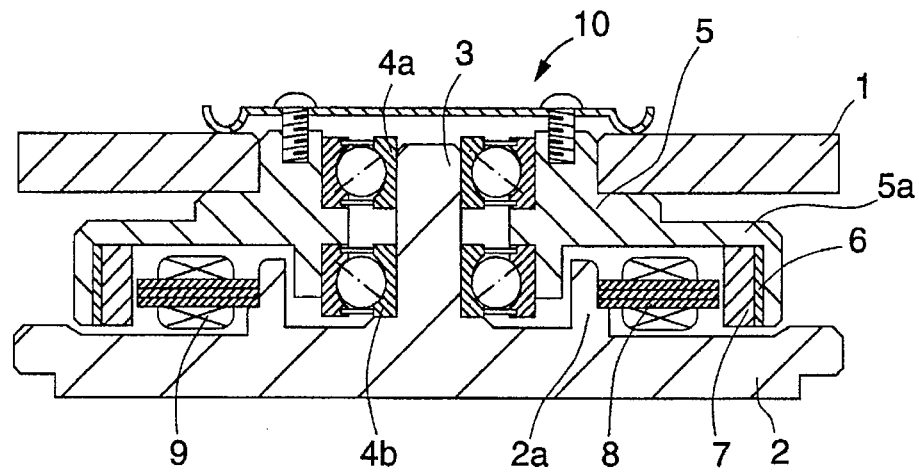
FIG. 1 is a sectional view showing a shaft-fixed light deflecting system of a first embodiment of the invention.

FIG. 1 is a sectional view showing a shaft-fixed light deflecting system of the first embodiment of the present invention. In FIG. 1, reference numeral 2 denotes a frame that is mounted to a main body apparatus as a base of the light deflecting system. A fixed shaft 3 is erected at the center of the frame 2 integrally with the frame 2. The inner races of a pair of ball bearings 4a, 4b are fixed with the outer circumference of the fixed shaft 3. The outer races of the ball bearings 4a, 4b are fixed with the inner hole of a hub 5. The hub 5 is rotatably supported with respect to the fixed shaft 3 by the ball bearings 4a, 4b. It may be noted that a predetermined preload is applied to the respective ball bearings 4a, 4b in the directions indicated by the one dot chain lines in FIG. 1.

A yoke 6 made of a magnetic material is fixed within the inner circumference of a cup-shaped flange portion 5a formed at a lower portion of the hub 5. An annular drive magnet 7 which has a plurality of salient magnetic poles is secured to the inner circumferential surface of the yoke 6. A polygon mirror 1 is carried on the hub 5 with the central hole thereof set into the hub 5. The polygon mirror 1 is fixed to the hub 5 by a clamper 10.

On the other hand, a core holding portion 2a projecting in the axial direction is arranged further on the outer circumferential side of the fixed shaft 3 erected on the frame 2. A stator core 8 having a plurality of salient magnetic poles with a coil wound on it is fitted with the outer circumference of the core holding portion 2a. The outer circumferential surface of each salient magnetic pole of the stator core 8 confronts the inner circumferential surface of the drive magnet 7 while interposing an appropriate distance therebetween. When the coil 9 is energized, not only the drive magnet 7 but also the hub 5 are rotated by electromagnetism produced between the stator core 8 and the drive magnet 7. Further, since the polygon mirror 1 is fixed to the hub 5 by the clamper 10, not only the hub 5 but also the polygon mirror 1 are also rotated.

By the way, in the thus constructed light deflecting system, the polygon mirror 1, the hub 5, and the fixed shaft 3 are made of the same material. For example, all these members are made of an aluminum alloy containing silicon, copper, chromium, or the like, or of pure aluminum. That is, these members have the same linear expansion coefficient, which is set to about $23.1 \times 10^{-6}/°$ C. It should be noted that the polygon mirror 1, the hub 5, and the fixed shaft 3 may be made of a metal different from aluminum, for instance, a zinc alloy, a stainless steel, or a nickel steel, or made of different metals as long as the coefficients of linear expansion of such metals are substantially equal to one another.

It may be noted that the reason why the aluminum alloy or pure aluminum is selected in the first embodiment is that aluminum has good mechanical properties such as machinability, inexpensiveness, lightness, and corrosion resistance.

By having made the fixed shaft 3 and the hub 5 of the materials whose coefficients of linear expansion are equal to each other, the fixed shaft 3 and the hub 5 expand and contract similarly to each other when temperature changes. Therefore, the pre-load applied to the ball bearings 4a, 4b interposed between the fixed shaft 2 and the hub 5 does not change but is maintained constant at all times. Hence, the rotating body including the hub 5 and the polygon mirror 1 can rotate consistently, which in turn allows an apparatus capable of providing high-quality image to be implemented.

Further, by having made the hub 5 and the polygon mirror 1 of the materials whose coefficients of linear expansion are equal to each other, there is no strain or stress produced between the hub and the polygon mirror due to change in temperature, which in turn allows the polygon mirror to rotate accurately, thereby contributing to achieving an apparatus producing high-quality image.

While an embodiment in which the frame 2 and the fixed shaft 3 are formed integrally with each other has been described in the first embodiment, the invention can, of course, be applied to a light deflecting system having such construction that a hole is arranged at the center of the frame 2 to allow the fixed shaft 3 to be set into such hole. However, in such a case, the fixed shaft 3 is made of a material whose coefficient of linear expansion is equal to the linear expansion coefficient of the hub 5 and the polygon mirror 1.

2nd Embodiment

A second embodiment of the invention will be described with reference to FIG. 2

Figure 2:
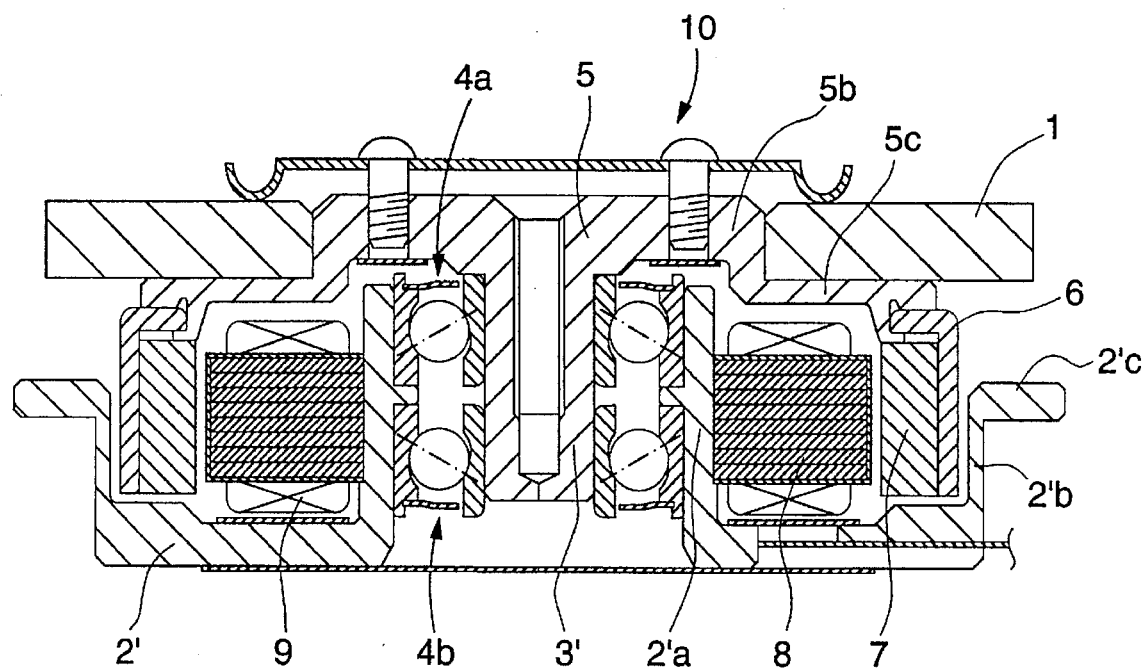
FIG. 2 is a sectional view showing a shaft-fixed light deflecting system of a second embodiment of the invention.
Figure 3:
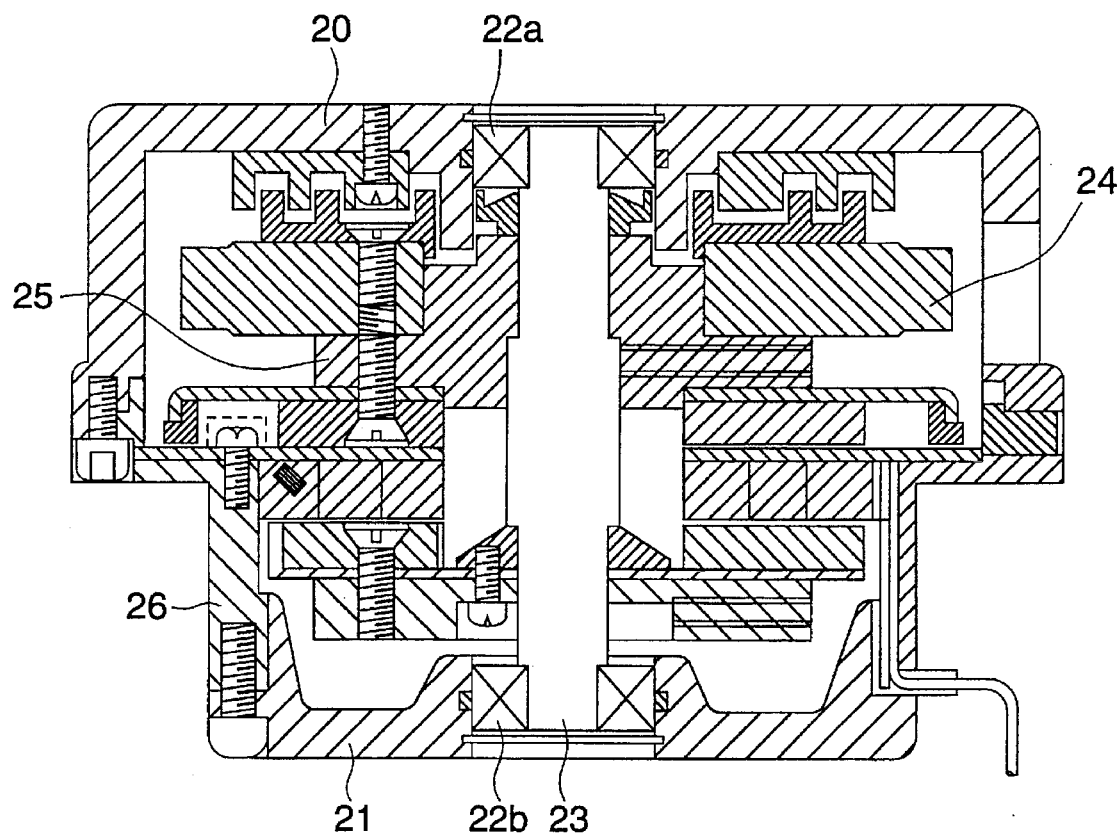
FIG. 3 is a sectional view showing an example of a conventional light deflecting system.

The embodiment shown in FIG. 2 is structurally distinguished from the light deflecting system shown in FIG. 1. That is, the embodiment of FIG. 2 is a shaft rotating light deflecting system. In FIG. 2, parts and components having the same functions as those shown FIG. 1 are denoted by the same reference numerals, and the description thereof is omitted.

A cup-shaped frame 2' has a cylindrical holder portion 2'a in the center thereof so as to be integral with each other. A collar-shaped mounting portion 2'c that allows the frame 2' to be mounted to the main body apparatus is arranged on top of a circumferential wall 2'b. A stator core 8 is secured to the outer circumferential surface of the holder portion 2'a. The stator core 8 is formed by laminating a plurality of core plates made of a magnetic material, and has a plurality of salient magnetic poles radially projecting from the center thereof. Each salient magnetic pole has a coil 9 wound on it.

The outer races of a pair of ball bearings 4a, 4b are fixed with the inner circumferential surface of the holder portion 2'a of the frame 2'. A shaft portion 3' of a hub 5 is mounted onto the inner races of the ball bearings 4a, 4b. A predetermined pre-load is applied to the ball bearings 4a, 4b in the directions indicated by the one dot chain lines in FIG. 2.

The hub 5 has the shaft portion 3', a disk-shaped base portion 5b, and a mirror carrying portion 5c. The shaft portion 3' functions as a rotating shaft projecting downward from the center as viewed in FIG. 2. The base portion 5b is arranged on the upper side of the shaft portion 3'. The mirror carrying portion 5c which is lower than the base portion is arranged on the outer circumferential side of the base portion 5b. The polygon mirror 1 is carried on the mirror carrying portion 5c with the central hole thereof fitted with the outer circumferential surface of the base portion 5b. The polygon mirror 1 is fixed by a clamper 10. Therefore, the hub 5 is made rotatable with respect to the frame 2' by the ball bearings 4a, 4b.

A yoke 6 made of a magnetic material is secured to the outer circumferential edge portion of a lower end corner of the mirror carrying portion 5c of the hub 5. A ring-shaped drive magnet 7 is attached to the inner circumferential surface of the yoke 6. The inner circumferential surface of the drive magnet 7 confronts the salient magnetic poles of the stator core 8 so as to interpose an appropriate distance therebetween. By energizing the drive coil 9 wound around each salient magnetic pole of the stator core 8, the drive magnet 7 is energized to rotate the hub 5 together with the polygon mirror 1.

In the thus constructed shaft rotating light deflecting system, the shaft portion 3' functioning as the rotating shaft, the hub 5, the polygon mirror 1, and the frame 2' are made of materials whose coefficients of linear expansion are equal to one another. For example, all these members are made of a metal whose main composition is aluminum, and the coefficient of linear expansion thereof is about $23.1 \times 10^{-6}/°$ C.

These members may be made of a metal different from aluminum, e.g., a zinc alloy, a stainless steel, or a nickel steel, or made of different metals as long as the coefficients of linear expansion of such metals are equal to one another.

It may be noted that the reason why the aluminum alloy or pure aluminum is selected in the second embodiment is that aluminum has good mechanical properties such as machinability, inexpesiveness, lightness, and corrosion resistance.

By having made the shaft portion 3, the hub 5, and the frame 2' of the materials whose coefficients of linear expansion are equal to one another, these members expand and contract similarly to each other when temperature changes. Therefore, the pre-load applied to the ball bearings 4a, 4b interposed between the shaft portion 3' and the frame 2' does not change but is maintained constant at all times. Therefore, the rotating body including the hub 5 and the polygon mirror 1 can rotate consistently, which in turn allows an apparatus capable of providing high-quality image to be implemented.

Further, the hub 5 and the polygon mirror 1 are similarly made of the materials whose coefficients of linear expansion are equal to each other. Therefore, the polygon mirror 1 can rotate accurately free from strain and stress between the hub and the polygon mirror produced by temperature change, thereby allowing a system capable of producing high-quality image to be implemented.

While an embodiment in which the hub 5 and the shaft portion 3' are formed integrally with each other has been described in the second embodiment, the invention can, of course, be applied to a light deflecting system having such construction that a hole is arranged at the center of the hub 5 to allow the shaft portion 3' to be fixedly set into such a hole.

Further, the frame 2' and the holder portion 2'a are not necessarily be integrated with each other, but may be separate members, although not shown. However, in this case, the holder portion 2'a is made of a material whose coefficient of linear expansion is equal to the coefficient of linear expansion of the shaft portion 3', the hub 5, and the polygon mirror 1.

In the shaft-fixed light deflecting system disclosed as the first embodiment of the invention, the fixed shaft and the hub are made of materials whose coefficients of linear expansion are equal to each other. Therefore, the fixed shaft and the hub expand and contract similarly to each other when temperature changes, thereby maintaining the pre-load applied to the ball bearings interposed between both members constant at all times. As a result, the rotating body including the hub and the polygon mirror can rotate consistently, thereby allowing a system capable of providing high-quality image to be implemented.

Further, since the hub and the polygon mirror are made of materials whose coefficients of linear expansion are equal to each other, there is no strain or stress produced between the hub and polygon mirror due to temperature change, thereby allowing a system capable of providing high-quality image to be implemented.

Still further, in the shaft rotating light deflecting system described as the second embodiment of the invention, the frame that holds the ball bearings and the shaft formed on the hub are made of materials whose coefficients of linear expansion are equal to each other. Therefore, the frame and the shaft portion expand and contract similarly to each other when temperature changes, which in turn allows the preload applied to the ball bearings interposed between both members to be maintained constant at all times. As a result, the rotating body including the hub and the polygon mirror can rotate consistently, thereby allowing a system capable of producing high-quality image to be implemented.

Still further, the hub and the polygon mirror are also made of materials whose coefficients of linear expansion are equal to each other, so that there is no strain or stress produced between the hub and the polygon mirror, which in turn allows the polygon mirror to rotate accurately, thereby contributing to implementing a system capable of producing high-quality image.

What is claimed is:

1. A rotary polygon mirror type light deflecting system comprising:

a shaft;

ball bearings fixed with said shaft;

a hub rotatably supported by said ball bearings;

a drive magnet attached to said hub so as to rotate integrally with said hub;

a stator core arranged so as to confront said drive magnet;

a frame for holding said stator core; and a polygon mirror mounted on said hub so as to rotate integrally with said hub, wherein said shaft, said hub, and said polygon mirror are made of materials whose coefficients of linear expansion are equal to one another, and wherein said shaft is a fixed shaft formed integrally with said frame.

2. A rotary polygon mirror type light deflecting system according to claim 1, wherein said shaft, said hub, and said polygon mirror are made of metals whose main composition is aluminum.

3. A rotary polygon mirror type light deflecting system comprising:

a shaft;

ball bearings fixed with said shaft;

a hub rotatably supported by said ball bearings;

a drive magnet attached to said hub so as to rotate integrally with said hub;

a stator core arranged so as to confront said drive magnet;

a frame for holding said stator core; and a polygon mirror mounted on said hub so as to rotate integrally with said hub, wherein said shaft, said hub, and said polygon mirror are made of materials whose coefficients of linear expansion are equal to one another, and wherein said shaft is a rotary shaft formed integrally with said hub, said rotary shaft is supported by said ball bearings fitted with said frame, a coefficient of linear expansion of said frame is equal to the coefficient of linear expansion of said shaft, said hub, and said polygon mirror.

4. A rotary polygon mirror type light deflecting system according to claim 3, wherein said shaft, said hub, said polygon mirror, and said frame are made of metals whose main composition is aluminum.

* * * * *